(12) United States Patent
Hu

(10) Patent No.: US 11,540,028 B2
(45) Date of Patent: Dec. 27, 2022

(54) INFORMATION PRESENTING METHOD, TERMINAL DEVICE, SERVER AND SYSTEM

(71) Applicant: TENCENT TECHNOLOGY (SHENZHEN) COMPANY LIMITED, Shenzhen (CN)

(72) Inventor: Xiaohua Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/211,783

(22) Filed: Mar. 24, 2021

(65) Prior Publication Data

US 2021/0211777 A1 Jul. 8, 2021

Related U.S. Application Data

(60) Division of application No. 15/666,777, filed on Aug. 2, 2017, now Pat. No. 10,999,646, which is a
(Continued)

(30) Foreign Application Priority Data

Jun. 12, 2015 (CN) .......................... 201510323161.9

(51) Int. Cl.
*H04N 21/6547* (2011.01)
*G06F 16/40* (2019.01)
*H04N 21/458* (2011.01)

(52) U.S. Cl.
CPC ......... *H04N 21/6547* (2013.01); *G06F 16/40* (2019.01); *H04N 21/458* (2013.01)

(58) Field of Classification Search
CPC ............ H04N 21/6547; H04N 21/458; H04N 21/235; H04N 21/4316; H04N 21/43; G06F 17/30017; G06F 16/40; G06F 17/30
(Continued)

(56) References Cited

U.S. PATENT DOCUMENTS 9,716,918 B1  7/2017 Lockton et al.
2002/0091762 A1* 7/2002 Sohn ..................... G06F 3/0481
                                                                 709/203
(Continued)

FOREIGN PATENT DOCUMENTS

CN      101080017 A    11/2007
CN      101594538 A    12/2009
(Continued)

OTHER PUBLICATIONS

Office Action in CN Application No. 201510323161.9 dated Jul. 26, 2017, 8 pages.
(Continued)

*Primary Examiner* — Tonia L Dollinger
*Assistant Examiner* — Mehulkumar J Shah
(74) *Attorney, Agent, or Firm* — Anova Law Group PLLC

(57) ABSTRACT

The present disclosure discloses an information presenting method, terminal device, server and system. The method applies to a server providing an online streaming media playing service. When providing the online streaming media playing service for a terminal device, the method includes: determining whether the terminal device is to present information presentation; when determining that the terminal device is to present the information, sending a presentation time parameter to the terminal device, so that the terminal
(Continued)

device presents the information in a time range indicated by the presented time parameter.

17 Claims, 6 Drawing Sheets

Related U.S. Application Data continuation of application No. PCT/CN2016/081065, filed on May 5, 2016.

(58) Field of Classification Search
USPC ........................................................ 709/203
See application file for complete search history.

(56) References Cited

U.S. PATENT DOCUMENTS

| | | | |
|---|---|---|---|
| 2005/0144225 A1 | 6/2005 | Anderson et al. | |
| 2007/0067597 A1* | 3/2007 | Chen | H04L 67/303 711/170 |
| 2007/0220010 A1 | 9/2007 | Ertugrul | |
| 2008/0013724 A1* | 1/2008 | Shamoon | H04N 21/44055 380/201 |
| 2009/0307732 A1* | 12/2009 | Cohen | H04N 21/25891 725/87 |
| 2010/0061466 A1* | 3/2010 | Gozen | H04N 21/43072 375/E7.026 |
| 2013/0016282 A1 | 1/2013 | Kim et al. | |
| 2013/0159421 A1 | 6/2013 | Yue et al. | |
| 2013/0254308 A1 | 9/2013 | Rose et al. | |
| 2014/0201797 A1 | 7/2014 | Kim et al. | |
| 2015/0256827 A1* | 9/2015 | Minezawa | H04N 19/117 375/240.03 |
| 2015/0317699 A1 | 11/2015 | Tian et al. | |
| 2016/0212495 A1 | 7/2016 | Chang et al. | |
| 2016/0285941 A1 | 9/2016 | Xie et al. | |
| 2016/0291921 A1* | 10/2016 | Miller | H04L 51/32 |
| 2016/0337426 A1 | 11/2016 | Shribman et al. | |
| 2017/0374429 A1* | 12/2017 | Yang | H04N 21/647 |

FOREIGN PATENT DOCUMENTS

| | | |
|---|---|---|
| CN | 102868922 A | 1/2013 |
| CN | 104883625 A | 9/2015 |
| JP | 2006262244 A | 9/2006 |
| JP | 2009530705 A | 8/2009 |
| JP | 2011176601 A | 9/2011 |
| WO | 2011134260 A1 | 11/2011 |

OTHER PUBLICATIONS

Search Report in International Application No. PCT/CN2016/081065 dated Jul. 21, 2016, 4 pages.

* cited by examiner

INFORMATION PRESENTING METHOD, TERMINAL DEVICE, SERVER AND SYSTEM

CROSS-REFERENCE TO RELATED APPLICATIONS

This application is a divisional of U.S. patent application Ser. No. 15/666,777, filed Aug. 2, 2017. U.S. patent application Ser. No. 15/666,777 is a continuation of International Application No. PCT/CN2016/081065, filed May 5, 2016, which claims the benefit and priority of Chinese Application No. 201510323161.9, filed Jun. 12, 2015. The entire disclosures of each of the above applications are incorporated herein by reference

FIELD

The present disclosure relates to internet technical fields, and more particularly, to an information presenting method, terminal device, server and system.

BACKGROUND

At present, more and more users uses terminal devices to play streaming media online, (e.g., watching online video or listening to online audio), more specifically, e.g., to watch live sports and to listen to online broadcasting etc. When providing an online streaming media playing service for a terminal device, a server performs encoding for streaming media (e.g., video encoding and/or audio encoding), obtains a media stream of the streaming media, and sends the media stream of the streaming media to the terminal device receiving the online playing service through Content Delivery Network (CDN). The terminal device parses the media stream, and plays it.

SUMMARY

The present disclosure provides an information presenting method, terminal device, server and system, so as to reduce online media playing time delay.

The present disclosure provides an information presenting method, which applies to a server providing an online streaming media playing service, when providing the online streaming media playing service for a terminal device, the method includes:

determining whether the terminal device is to present information presentation;

when determining that the terminal device is to present the information, sending a presentation time parameter to the terminal device, so that the terminal device presents the information in a time range indicated by the presented time parameter.

The present disclosure provides an information presenting method, which applies to a terminal device accepting an online streaming media playing service, when accepting the online streaming media playing service provided by a first server, the method includes:

receiving a presentation time parameter from the first server;

determining a time range indicated by the obtained presented time parameter;

obtaining information to be presented in the determined time range from a second server providing an information presentation service;

presenting the obtained information in the time range.

The present disclosure provides a server, when providing the online streaming media playing service for a terminal device, the server includes:

a processor for executing instructions stored in a non-transitory machine readable storage medium to:

determine whether the terminal device is to present information presentation;

when determining that the terminal device is to present the information, send a presentation time parameter to the terminal device, so that the terminal device presents the information in a time range indicated by the presented time parameter.

The present disclosure provides a terminal device, when accepting the online streaming media playing service provided by a first server, the terminal device includes:

a processor for executing instructions stored in a non-transitory machine readable storage medium to:

receive a presentation time parameter from the first server;

determine a time range indicated by the obtained presented time parameter;

obtain information to be presented in the determined time range from a second server providing an information presentation service;

present the obtained information in the time range.

The present disclosure provides an information presenting system, which includes a first server, a second server and a terminal device:

the first server is to when providing the online streaming media playing service for a terminal device, determine whether the terminal device is to present information presentation currently; when determining that the terminal device is to present the information, send a presentation time parameter to the terminal device, so that the terminal device presents the information in a time range indicated by the presented time parameter;

the terminal device is to when accepting the online streaming media playing service provided by a first server, receive a presentation time parameter from the first server; determine a time range indicated by the obtained presented time parameter; obtain information to be presented in the determined time range from the second server providing an information presentation service; present the obtained information in the time range.

According to the technical solution above, online media playing time delay is reduced, and information can be presented in real time. Further, because the server does not need to perform content cut processing and content insertion processing for the streaming media, processing load of the server is reduced. Further, the terminal devices accepting a same online streaming media playing service obtain presented information from the server providing the information presentation service, so as to realize synchronization of the presented information for the different terminal devices.

DRAWINGS

To describe the technical solutions in the embodiments of the present invention or in the existing technology more clearly, the following briefly introduces the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in embodiments of the present disclosure with reference to the accompanying drawings in the embodiments of the present invention. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

During a research process, an inventor of the present disclosure found that when providing an online streaming media playing service for a terminal device, a server may further simultaneously provide an information presenting service for the terminal device (e.g., presenting advertisement information, promotional information etc.). In particular, when providing the online streaming media playing service for the terminal device in a time period, the server may buffer the streaming media played online, may cut off content of the streaming media in the time period, and inserts information to be presented (such as inserting advertisement content). After that, the server encodes the stream media after cut processing and insertion processing are performed, and transmits the encoded media stream to the terminal device. Since the streaming media is firstly buffered, and then the cut processing and the insertion processing are performed for the streaming media, time delay of online playing delay is increased.

In view of this, an information presenting method is provided according to an embodiment of the present disclosure. According to the method provided by the embodiment of the present disclosure, when providing online streaming media playing service for a terminal device, a server determines whether the terminal device is to perform information presentation currently. When determining that the terminal device is to present the information, a presentation time parameter is sent to the terminal device by the server, so that the terminal device presents the information within a time range indicated by the presentation time parameter. Thus, the time delay of online media playing is reduced, and information is presented in real time. Further, because the server does not need to perform the content cut processing and the content insertion processing for the streaming media, processing load of the server is reduced. Further, the terminal devices accepting a same online streaming media playing service obtain presented information from the server providing the information presentation service, so as to realize synchronization of the presented information for the different terminal devices.

Figure 1:
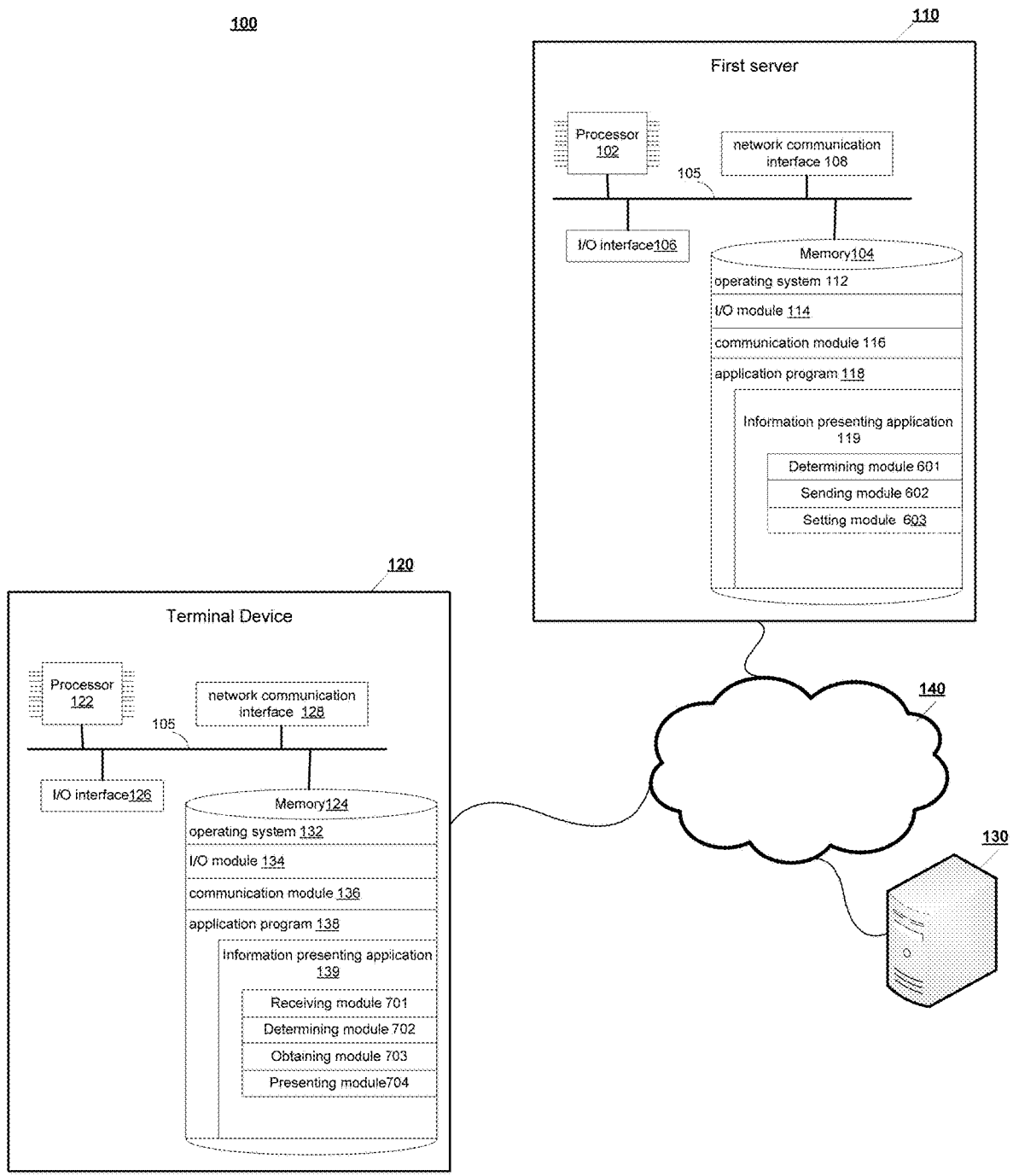
FIG. 1 is a schematic diagram illustrating a structure of an information presenting system according to various embodiments of the present disclosure.

FIG. 1 is a diagram illustrating a structure of an information presenting system according to an embodiment of the present disclosure. As shown in FIG. 1, a system 100 includes a first server 110, a terminal device 120, a second server 130, and a communication network 140.

When providing online streaming media playing service for a terminal device, the first server 110 is to determine whether the terminal device 120 needs to present information currently; when it is determined that the terminal device 120 needs to present information, sent a presentation time parameter to the terminal device 120, so that the terminal device 120 presents the information within a time range indicated by the presentation time parameter.

In an example of the present disclosure, the first server 110 may be a computing device having functions of calculating, processing and storing data. For example, as shown in FIG. 1, the first server 110 may include a processor 102, a non-transitory computer readable memory 104, an I/O interface 106, and a network communication interface 108. These components communicate via a bus 105.

In an example of the present disclosure, a plurality of program modules are stored in the memory 104, which include an operating system 112, an I/O module 114, a communication module 116 and an application program 118. The processor 102 may read the program module in the memory to realize a scheme provided according to an embodiment of the present disclosure.

In the example of the present disclosure, the I/O interface 106 may be connected with an input/output device, such as a touch screen, a microphone, a loudspeaker, etc. The I/O interface 106 sends input data received from an input device to the I/O module 114 to process, and sends data outputted from the I/O module 114 to an output device.

The network communication interface 108 may transmit data received from the communication network 140 to the communication module 116, and may send data received from the communication module 116 through the communication network 140.

The application program 118 stored in the memory 104 may include an information presentation application 119. As shown in FIG. 1, the information presentation application 119 may include a determining module 601, a sending module 602. Further, the information presentation application 119 may also include a setting module 603, specific functions and work principles of the modules 601-603 will be subsequently described in detailed. The processor 102 may determine whether the terminal device 120 needs to present information currently by executing the information presentation application 119; when it is determined that the terminal device 120 needs to present the information, a presentation time parameter is sent to the terminal device 120.

When accepting the online streaming media playing service provided by the first server, the terminal device 120 is to receive a presentation time parameter from the first server 110, determine a time range indicated by the obtained presentation time parameter, obtain information to be presented within the determined time range from a second server providing information presenting service; present the obtained information within the time range.

In an embodiment of the present disclosure, the terminal device 120 may be a computing device having functions of calculating, processing and storing data, which includes, but not limited to, a smartphone, a PDA, a tablet PC, etc. These communication terminals are installed with operating systems, which includes, but not limited to, Android operating system, Symbian operating system, Windows mobile operating system, and iPhone OS operating system, etc. For example, as shown in FIG. 1, the terminal device 120 may include a processor 122, a non-transitory computer readable memory 124, an I/O interface 126, and a network communication interface 128. These components communicate via a bus 105.

In an embodiment of the present disclosure, a plurality of program modules are stored in the memory 124, which include an operating system 132, an I/O module 134, a communication module 136 and an application program 138. The processor 122 may read the program modules in the memory to realize a scheme provided by an embodiment of the present disclosure.

In an embodiment of the present disclosure, the I/O interface 126 may be connected with an input/output device, such as a touch screen, a microphone, a loudspeaker, etc. The I/O interface 126 sends input data received from the input device to the I/O module 134 for processing, and sends the output data of the I/O module 134 to the output device.

The network communication interface 128 may transmit data received from the communication network 140 to the communication module 136, and may send data received from the communication module 136 through the communication network 140.

The application program 138 stored in the memory 124 may include an information presentation application 139. As shown in FIG. 1, the information presentation application 139 may include a receiving module 701, a determining module 702, an obtaining module 703 and a presenting module 704. Further, the processor 122 may receive a presentation time parameter from the first server 110 by executing the information presentation application 139, determine a time range indicated by the obtained presentation time parameter; obtain information to be presented within the determined time range from a second server 130 providing an information presenting service, and present the obtained information within the time range.

The communication network 140 may be wireless or wired communication network, such as a CDN network, an IP network, a cellular mobile communication network, etc.

Figure 2:
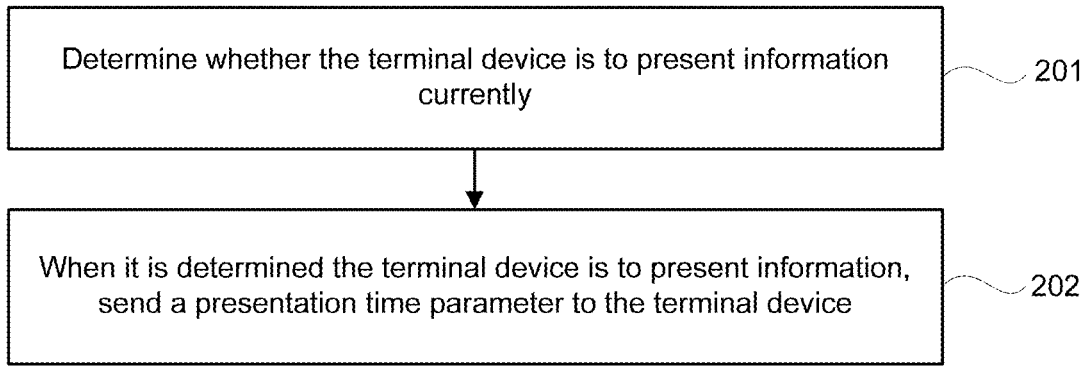
FIG. 2 is a flowchart diagram illustrating an information presenting method according to various embodiments of the present disclosure.

FIG. 2 is a flowchart illustrating an information presenting method according to various embodiments of the present disclosure. The method applies to a server providing an online streaming media playing service. As shown in FIG. 2, when providing the online streaming media playing service for a terminal device, the method includes procedures as follows.

At block 201, determine whether the terminal device is to present information currently;

At block 202, when it is determined the terminal device is to present information, send a presentation time parameter to the terminal device.

In an embodiment of the present disclosure, the presentation time parameter includes a start presentation time point and an end presentation time point. In another embodiment of the present disclosure, the presentation time parameter includes a time length of presentation.

In an embodiment of the present disclosure, the presentation time parameter may be sent to the terminal device through any one of the following methods:

Method 1: the presentation time parameter is carried in a notification message to be sent to the terminal device, and the notification message carrying the presentation time parameter is sent to the terminal device.

Method 2: An indication field is attached to an encoded media stream corresponding to streaming media to be sent to the terminal device, and the indication field is filled with an invalid value, so that when parsing out that the indication field is an invalid value, the terminal device determines not to perform information presentation. Before sending the media stream to which the indication field is attached, the presentation time parameter is filled into the indication field. The media stream is transmitted to the terminal device, wherein the media stream carries the indication field filled with the presentation time parameter.

Method 3: A flag and an indication field are attached to an encoded media stream corresponding to the streaming media to be sent to the terminal device, and the flag is set to be invalid, so that the terminal device determines not to perform information presentation when parsing out that the flag is invalid. Before sending the media stream carrying the flag and the indication field, the flag is set to be valid, and the presentation time parameter is filled into the indication field. The server sends the media stream to the terminal device, wherein the media stream carries the flag set to be valid and the indication field filled with the presentation time parameter.

Method 4: A reserved field is filled with an invalid value in the encoded media stream corresponding to the streaming media to be sent to the terminal device, so that the terminal device determines not to perform information presentation when parsing out that the reserved field is invalid. The server fills the presentation time parameter in the reserved field before sending the media stream including the reserved field. The server sends the media stream to the terminal device, wherein the media stream includes the reserved field filled with the presentation time parameter.

Method 5: A reserved flag is set to be an invalid value in the encoded media stream corresponding to the streaming media to be sent to the terminal device, so that the terminal device determines not to present the information when parsing out that the reserved flag is invalid. Before sending the media stream including the reserved flag, the server sets the reserved flag to be valid, and fills a reserved field with the presentation time parameter, the server sends the media stream to the terminal device, wherein the media stream carries the reserved flag set to be valid and the reserved field filled with the presentation time parameter.

Figure 3:
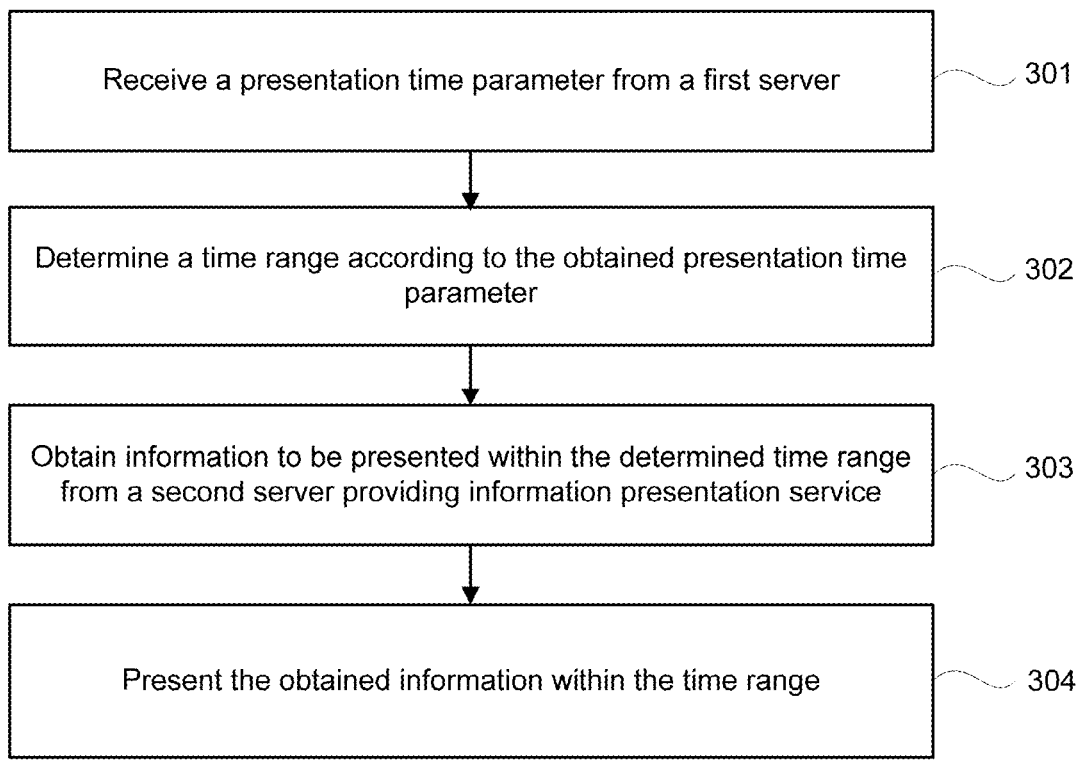
FIG. 3 is a flowchart diagram illustrating an information presenting method according to various embodiments of the present disclosure.

FIG. 3 is a flowchart illustrating an information presenting method according to various embodiments of the present disclosure. The method applies to a terminal device accepting online streaming media playing service. As shown in FIG. 3, when accepting the online streaming media playing service provided by a first server, the method includes procedures as follows:

At block 301, receive a presentation time parameter from a first server;

In an embodiment of the present disclosure, the terminal device receives a notification message sent by the first server, and obtains presentation time parameter from the notification message.

In an embodiment of the present disclosure, the terminal device receives an encoded media stream corresponding to the streaming media from the first server, and parses the indication field attached to the media stream. When parsing out that the value of the indication field is valid, the terminal device obtains the presentation time parameter according to the parsed value of the indication field.

In an embodiment of the present disclosure, the terminal device receives the encoded media stream corresponding to the streaming media from the first server, and parses the flag attached to the media stream. When parsing out that the flag is valid, the terminal device further parses the indication field attached to the media stream, and obtains the presentation time parameter according to the parsed value of the indication field.

In an embodiment of the present disclosure, the terminal device receives the encoded media stream corresponding to the streaming media from the first server, and parses the reserved field in the media stream. When parsing out that value of the reserved field is valid, the terminal device obtains the presentation time parameter according to the parsed value of the indication field.

In an embodiment of the present disclosure, the terminal device receives the encoded media stream corresponding to the streaming media from the first server, and parses the reserved flag in the media stream. When parsing out that value of the reserved flag is valid, the terminal device parses the reserved field in the media stream, and obtains the presentation time parameter according to the parsed value of the reserved field.

At block 302, determine a time range according to the obtained presentation time parameter.

At block 303, obtain information to be presented within the determined time range from a second server providing information presentation service.

In an embodiment of the present disclosure, the terminal device transmits an information obtaining request to the second server. The information obtaining request at least carries a presentation number of information and a length of the determined time range. The terminal device receives the information from the second server.

At block 304, present the obtained information within the time range.

Figure 4:
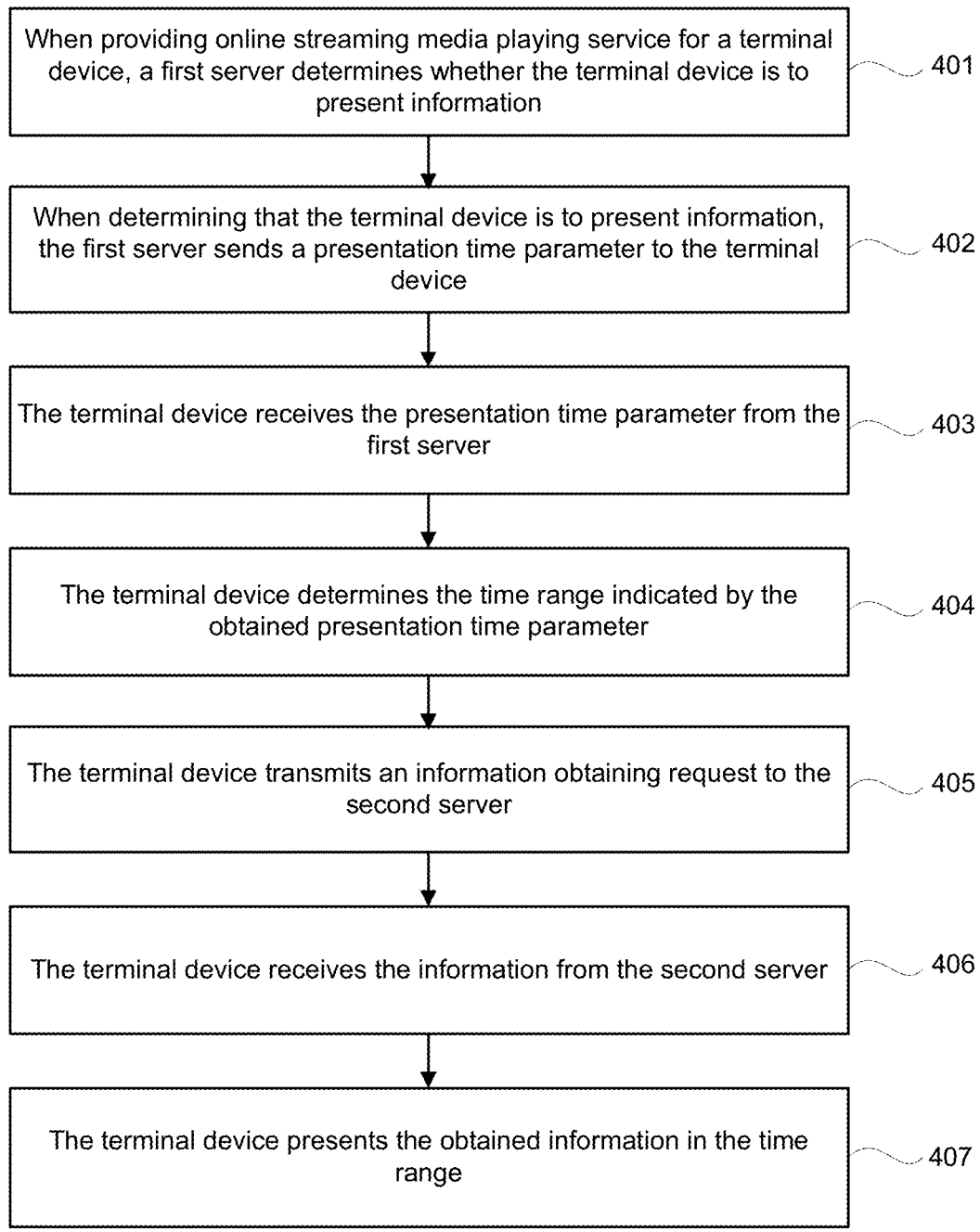
FIG. 4 is a flowchart diagram illustrating an information presenting method according to various embodiments of the present disclosure.

FIG. 4 is a flowchart illustrating an information presenting method according to various embodiments of the present disclosure. As shown in FIG. 4, the method includes procedures as follows:

At block 401, when providing online streaming media playing service for a terminal device, a first server determines whether the terminal device is to present information.

The first server may be a server providing online streaming media playing service.

In an embodiment of the present disclosure, the first server may determine whether the terminal device is to present information according to a preset information presentation time range. For example, in a live football game, it is preset that the terminal device presents information in rest time between a first half and a second half. When the live football game enters the fixed rest time between the first half and the second half, the first server determines that the terminal device is to present information.

In an embodiment of the present disclosure, the first server may determine whether the terminal device is to present information by analyzing the streaming media. For example, in a live sports game, when information presentation is to be performed in temporary rest time, the first server may determine whether the sport corresponding to the streaming media enters a temporary rest time range through analyzing the streaming media, when determining that the sports game is within the temporary rest time range, the first server determines the terminal device is to present information.

At block 402, when determining that the terminal device is to present information, the first server sends a presentation time parameter to the terminal device.

In an embodiment of the present disclosure, the presentation time parameter includes a start presentation time point and an end presentation time point. Thus, the time range indicated by the presentation time parameter is a time range from the start presentation time point to the end presentation time point. In another embodiment of the present disclosure, the presentation time parameter includes a presentation time length. Thus, the time range indicated by the presentation time parameter starts from a current time point taken as the start presentation time port, and continues the presentation time length.

In an embodiment of the present disclosure, the first server carries the presentation time parameter in a notification message to be sent to the terminal device, and sends the notification message carrying the presentation time parameter to the terminal device.

Figure 5A:
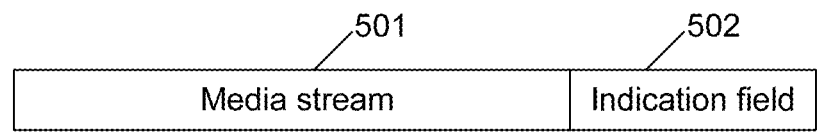
FIGS. 5A-5D are schematic diagrams illustrating structures of an encoded media stream corresponding to streaming media according to various embodiments of the present disclosure.

In an embodiment of the present disclosure, before block 402, the method may further include that: the first server attaches an indication field to the encoded media stream corresponding to streaming media to be sent to the terminal device, and fills the indication field with an invalid value. The encoded media stream may be an encoded video media stream and/or an encoded audio media stream. The indication field is used to indicate the presentation time parameter when it is determined the terminal device is to present information. The indication field may be attached to a header or a tailor of the media stream. As shown in FIG. 5A, the indication field 502 is attached to the tailor of the media stream 501. When it is determined that the terminal device is to present information, the indication field is filled with the presentation time parameter before sending the media stream carrying the indication field.

Figure 5B:
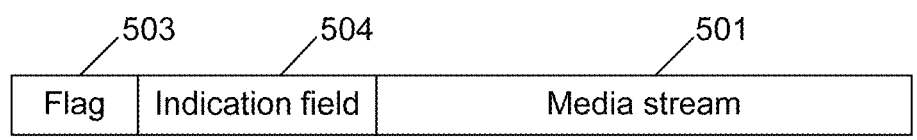

In an embodiment of the present disclosure, before block 402, the method may further include: the first server attaches a flag and an indication field to the encoded media stream corresponding to streaming media to be sent to the terminal device, and sets the flag to be invalid. The flag indicates whether the terminal device is to present information. When the flag is set as valid, the flag indicates that the terminal device is to present information, and the indication field indicates the presentation time parameter. The flag and the indication field may be attached to header or tailor of the media stream. As shown in FIG. 5B, the flag 503 and indication field 504 are attached to the header of the media stream 501. When it is determined that the terminal device is to present information, the flag is set as valid, and the indication field is filled with the presentation time parameter before sending the media stream carrying the flag and the indication field. The server sends the media stream to the terminal device, and the flag set as valid and the indicator field filled with the presentation time parameter is attached to the media stream.

Figure 5C:
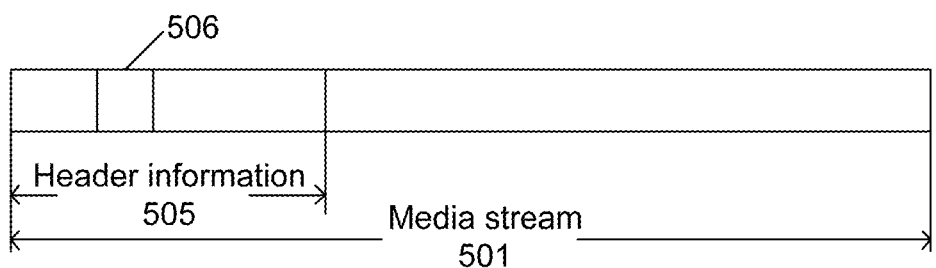

In an embodiment of the present disclosure, before block 402, the method may further include that: the first server fills an invalid value in a reserved field in the encoded media stream corresponding to streaming media to be sent to the terminal device. The reserved field is used to indicate the presentation time parameter when it is determined the terminal device is to present information. In an embodiment of the present disclosure, as shown in FIG. 5C, the reserved field 506 may be in the header information 505 of the encoded media stream. For example, for the media stream for which been MPEG-2 video encoding is performed, the reserved field may be in a reserved field in the MPEG-2 encoding header information. When it is determined that the terminal device is to present information, the first server fills the presentation time parameter in the reserved field before sending the media stream including the reserved field. The first server sends the media stream to the terminal device, and the media stream includes the reserved field filled with the presentation time parameter.

Figure 5D:
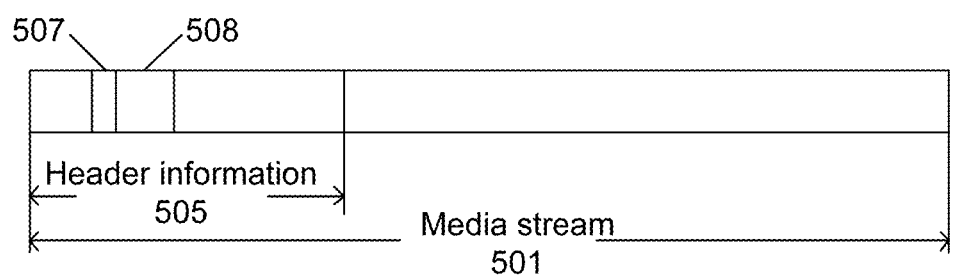

In an embodiment of the present disclosure, before block 402, the method may further include that: the first server sets a reserved flag as invalid in the encoded media stream corresponding to streaming media to be sent to the terminal device. The reserved flag is used to indicate whether the terminal device is to present information. When the reserved flag is set as valid, the reserved flag indicates that the terminal device is to present information, and the reserved flag indicates the presentation time parameter. In an embodiment of the present disclosure, as shown in FIG. 5D, the reserved flag 507 and the reserved field 508 may be in the header information 505 of the encoded media stream. For example, for the media stream after performing the H.264 video encoding, the reserved field may be a reserved field in the H.264 encoding header information. When it is determined that the terminal device is to present information, the first server sets the flag as valid and fills the reserved field in the media stream with the presentation time parameter before sending the media stream containing the reserved field. The first server sends the media stream to the terminal device, and the media stream includes the flag set as valid and the reserved field filled with the presentation time parameter.

At block 403, the terminal device receives the presentation time parameter from the first server.

In an embodiment of the present disclosure, the terminal device receives a notification message sent by the first server, and obtains the presentation time parameter from the notification message.

In an embodiment of the present disclosure, the terminal device receives the encoded media stream corresponding to the streaming media from the first server, and parses the indication field attached to the media stream. When parsing out that the indication field is invalid, the terminal device determines not to present information, and the process finishes. When parsing out that value of the indication field is valid, the terminal device obtains the presentation time parameter according to the parsed value of the indication field.

In an embodiment of the present disclosure, the terminal device receives the encoded media stream corresponding to the streaming media from the first server, and parses the flag attached to the media stream. When parsing out that the flag is set to be invalid, the terminal device determines not to present information and the process is finished. When parsing out that the flag is valid, the terminal device further parses the indication field attached to the media stream, and obtains the presentation time parameter according to the parsed value of the indication field.

In an embodiment of the present disclosure, the terminal device receives the encoded media stream corresponding to the streaming media from the first server, and parses the reserved field in the media stream. When parsing out that the reserved field is invalid, the terminal device determines not to present information and the process is finished. When parsing out that value of the reserved field is valid, the terminal device obtains the presentation time parameter according to the parsed value of the indication field.

In an embodiment of the present disclosure, the terminal device receives the encoded media stream corresponding to the streaming media from the first server and parses the reserved flag in the media stream. When parsing out that the reserved flag is set to be invalid, the terminal device determines not to present information and the process is finished. When parsing out that the value of the reserved flag is valid, the terminal device parses the reserved field in the media stream, and obtains the presentation time parameter according to the parsed value of the reserved field.

At block 404, the terminal device determines the time range indicated by the obtained presentation time parameter.

In an embodiment of the present disclosure, when the obtained presentation time parameter includes a start presentation time point and an end presentation time point, the time range indicated by the presentation time parameter is from the start presentation time point to the end presentation time point. When the obtained presentation time parameter includes a presentation time length, the time range indicated by the presentation time parameter starts from a current time point as the start presentation time point, and continues the presentation time length.

At block 405, the terminal device transmits an information obtaining request to the second server.

In an embodiment of the present disclosure, the second server may be a server providing an information presentation service. The information obtaining request at least carries a presentation number of the information and a length of the determined time range. A presentation number of the information is a serial number of the presented information in an online streaming media playing process. For example, for a first message presented in the online streaming media playing process, the presentation number of the information is 1. In another embodiment of the present disclosure, the information obtaining request may carry identification of the streaming media and the determined time range.

At block 406, the terminal device receives the information from the second server.

The received information may be in a form, e.g., video, audio, pictures, web pages etc., which is not limited in the present disclosure.

At block 407, the terminal device presents the obtained information in the time range.

In an embodiment of the present disclosure, after block 407, the method may further include: reporting an information presentation parameter to the second server. The information presentation parameter may include, but not limited to, a relevant parameter of the terminal device presenting the information (for example, a terminal device identifier, an IP address, a type etc.), an information presentation way (for example, presenting through a web page, presenting by an application etc.). In an embodiment of the presentation, the type of the terminal device includes, but is not limited to, personal computers, smart phones, projectors, etc.

The information presenting methods are described above according to various embodiments of the present disclosure. Devices provided according to various embodiment s of the present disclosure are described below with reference to the accompanying drawings.

Figure 6:
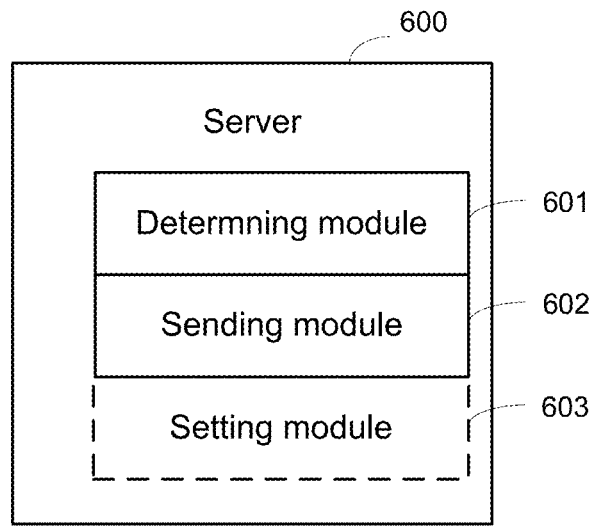
FIG. 6 is a schematic diagram illustrating a structure of a server according to various embodiments of the present disclosure.

FIG. 6 is a schematic diagram illustrating a structure of a server according to various embodiments of the present disclosure. As shown in FIG. 6, when providing the online streaming media playing service for a terminal device, the server includes the following modules.

A determining module 601 is to determine whether the terminal device is to present information presentation currently.

A sending module 602 is to when determining that the terminal device is to present the information, send a presentation time parameter to the terminal device, so that the terminal device presents the information in a time range indicated by the presented time parameter.

In an embodiment of the present disclosure, the sending module 602 is to carry the presentation time parameter in a notification message to be sent to the terminal device, send the notification message carrying the presentation time parameter to the terminal device.

In an embodiment of the present disclosure, the server further includes a setting module 603, to attach an indication field to an encoded media stream corresponding to a streaming media to be sent to the terminal device, fill the indication field with an invalid value, so that the terminal device determines not to present the information when parsing out that the indication field is the invalid value.

The sending module 602 is to fill the indication field with the presentation time parameter before sending the media stream to which the indication field is attached, send the media stream to the terminal device, wherein the indication field attached to the media stream is filled with the presentation time parameter.

In an embodiment of the present disclosure, the server further includes a setting module 603, to attach a flag and an indication field to the encoded media stream corresponding to the streaming media to be sent to the terminal device, set the flag as invalid, so that the terminal device determines not to present the information when parsing out that the flag is invalid.

The sending module 602 is to before sending the media stream to which the flag and the indication field are attached, set the flag as valid, fill the indication field with the presentation time parameters, send the media stream to the terminal device, wherein the flag attached to the media stream is set as valid, and the indication field attached to the media stream is filled with the presentation time parameter.

In an embodiment of the present disclosure, the server further includes: a setting module 603 to fill a reserved field with an invalid value in the encoded media stream corresponding to the streaming media to be sent to the terminal device, so that the terminal device determines not to present the information when parsing out that the reserved field is invalid.

The sending module 602 is to fill the reserved field with the presentation time parameter before sending the media stream comprising the reserved field, sending the media stream to the terminal device, wherein the media stream comprises the reserved field filled with the presentation time parameter.

In an embodiment of the present disclosure, the server further includes a setting module 603 to set a reserved flag as an invalid value in the encoded media stream corresponding to the streaming media to be sent to the terminal device, so that the terminal device determines not to present the information when parsing out that the reserved flag is invalid.

The sending module 602 is to before sending the media stream comprising the reserved flag, set the reserved flag as valid, and filling the reserved field with the presentation time parameter, send the media stream to the terminal device, wherein the media stream comprises the reserved flag set as valid and the reserved field filled with the presentation time parameter.

In an embodiment of the present disclosure, the presentation time parameter includes: a start presentation time point and an end presentation time point; or a presentation time length.

Figure 7:
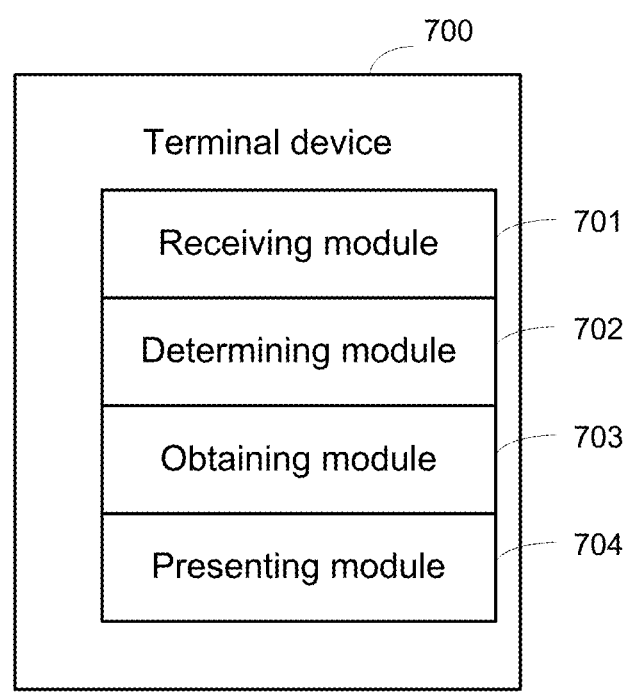
FIG. 7 is a schematic diagram illustrating a structure of a terminal device according to various embodiments of the present disclosure.

FIG. 7 is a schematic diagram illustrating a structure of a terminal device according to various embodiments of the present disclosure. As shown in FIG. 7, when accepting the online streaming media playing service provided by a first server, the terminal device includes the following modules.

A receiving module 701 is to receive a presentation time parameter from the first server.

A determining module 702 is to determine a time range indicated by the obtained presented time parameter.

An obtaining module 703 to obtain information to be presented in the determined time range from a second server providing an information presentation service.

A presenting module 704 is to present the obtained information in the time range.

In an embodiment of the present disclosure, the receiving module 701 is to receive a notification message sent from the first server, and obtain the presentation time parameter from the notification message.

In an embodiment of the present disclosure, the receiving module 701 is to receive an encoded media stream corresponding to streaming media from the first server, parse an indication field attached to the media stream, when parsing out that an value of the indication field is valid, obtain the presentation time parameter according to the parsed value of the indication field.

In an embodiment of the present disclosure, the receiving module 701 is to receive an encoded media stream corresponding to streaming media from the first server, parse a flag attached to the media stream, when parsing out that the flag is valid, parse an indication field attached to the media stream, obtain the presentation time parameter according to the parsed value of the indication field.

In an embodiment of the present disclosure, the receiving module 701 is to receive an encoded media stream corresponding to streaming media from the first server, parse a reserved field in the media stream, when parsing out that an value of the reserved field is valid, obtain the presentation time parameter according to the parsed value of the indication field.

In an embodiment of the present disclosure, the receiving module 701 is to receive an encoded media stream corresponding to streaming media from the first server, parse a reserved flag in the media stream, when parsing out that an value of the reserved flag is valid, parse a reserved field in the media stream, obtain the presentation time parameter according to the parsed value of the reserved field.

In an embodiment of the present disclosure, the obtaining module 703 is to send an information obtaining request to the second server, wherein the information obtaining request at least comprises a presentation number of the information and a length of the determined time range, so that the second server determines the information with the presentation number and the length of the time, and sends the information to the terminal device; receive the information from the second server.

Figure 8:
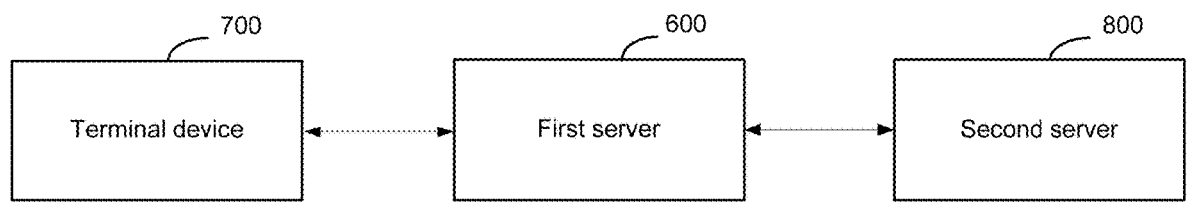
FIG. 8 is a schematic diagram illustrating a structure of an information presenting system according to various embodiments of the present disclosure.

The present disclosure provides an information presenting system. As shown in FIG. 8, the system includes a first server 600, a second server 800 and a terminal device 700.

The first server 600 is to when providing the online streaming media playing service for the terminal device 700, determine whether the terminal device 700 is to present information presentation currently; when determining that the terminal device is to present the information, send a presentation time parameter to the terminal device 700, so that the terminal device 700 presents the information in a time range indicated by the presented time parameter.

The terminal device 700 is to when accepting the online streaming media playing service provided by the first server 600, receive a presentation time parameter from the first server 600; determine a time range indicated by the obtained presented time parameter; obtain information to be presented in the determined time range from the second server 800 providing an information presentation service; present the obtained information in the time range.

The server, the terminal device and the information presenting system provided according to the embodiments above have a same idea with method embodiments above, implementation processes are detailed in method embodiments, which is not repeatedly described herein.

Examples for specific use scenario of the information presenting method, the terminal device, the server and the system provided according to the present disclosure are described below. In an use scenario, when a sports game being watched by a user enters a break period, a terminal device plays advertisement. When the break period ends, the terminal device continues to play the sports game.

In addition, according to some examples of the present disclosure, various function modules may be integrated into a processing entity, or may be separately deployed in physical. The integrated entity above can be implemented through hardware, or can be implemented through a software functional entity. The function modules in some examples can be located in a terminal or network point, or may be distributed to multiple terminal or network points.

In addition, each embodiment of the present disclosure may be implemented by data processing program executed by a data processing device, e.g., a computer. Obviously, the data processing program constitutes the present disclosure. In addition, a data processing program stored in a storage medium is usually executed by directly reading out the program from a storage medium or by installing or copying the program to a storage device (e.g., a hard disk and/or a memory) of the data processing device. Therefore, the storage medium also constitutes the present disclosure. The storage medium may use any category of record ways, e.g., a paper storage medium (e.g., paper tape, etc.), a magnetic storage media (e.g., a floppy disk, hard disk, flash memory, etc.), an optical storage medium (e.g., CD-ROM), a magneto optical storage medium (e.g., MO).

The present disclosure further provides a storage medium, the data processing program is stored in the storage medium, and the data processing program is configured to execute any method embodiment above according to the present disclosure.

Those ordinary skilled in the art will be appreciated that all or part of the steps in the above-described embodiments may be accomplished by hardware, or by a program instructing relevant hardware, wherein the program may be stored in a computer readable storage medium, and the mentioned storage medium may be a read-only memory, magnetic disk or optical disk.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. An information presenting method, applied to a terminal device configured to receive an online streaming media playing service provided by a first server, comprising:
  receiving an encoded media stream corresponding to streaming media from the first server;
  parsing the encoded media stream;
  in response to parsing out an invalid value from a field or a flag of the encoded media stream, determining not to transmit an information obtaining request to a second server providing an information presentation service, the information obtaining request being a request of obtaining information from the second server to be presented on the terminal device; and
  in response to no invalid value being parsed out from the field and the flag of the encoded media stream:
    parsing out a presentation time parameter from the field of the encoded media stream;
    determining a time range indicated by the presentation time parameter;
    obtaining information to be presented in the time range from the second server;
    presenting the obtained information in the time range.

2. The method according to claim 1, further comprising:
  receiving a notification message sent from the first server;
  obtaining the presentation time parameter from the notification message.

3. The method according to claim 1, wherein the field is an indication field attached to the media stream, and the method further comprises:
  parsing the indication field attached to the media stream;
  when parsing out that a value of the indication field is valid, obtaining the presentation time parameter according to the parsed value of the indication field; and
  when paring out that the value of the indication field is invalid, determining not to acquire information from the second server.

4. The method according to claim 1, wherein the field is an indication field attached to the media stream, and the method further comprises:
  parsing the flag attached to the media stream;
  when parsing out that the flag is valid, parsing the indication field attached to the media stream, and obtaining the presentation time parameter according to the parsed value of the indication field; and
  when parsing out that the flag is invalid, determining not to acquire information from the second server.

5. The method according to claim 1, wherein the field is a reserved field in the media stream, and the method further comprises:
  parsing the reserved field in the media stream;
  when parsing out that a value of the reserved field is valid, obtaining the presentation time parameter according to the parsed value of the reserved field; and
  when paring out that the value of the reserved field is invalid, determining not to acquire information from the second server.

6. The method according to claim 1, wherein the flag is a reserved flag in the media stream, and the field is a reserved field in the media stream, and the method further comprises:
  parsing the reserved flag in the media stream;
  when parsing out that a value of the reserved flag is valid, parsing the reserved field in the media stream, and obtaining the presentation time parameter according to the parsed value of the reserved field; and when parsing out that the value of the reserved flag is invalid, determining not to acquire information from the second server.

7. The method according to claim 1, wherein obtaining the information to be presented in the determined time range from the second server providing the information presentation service comprises:
sending an information obtaining request to the second server, wherein the information obtaining request at least comprises a presentation number of the information and a length of the determined time range, wherein the information obtaining request is configured to trigger the second server to determine the information with the presentation number and the length of the time, and send the information to the terminal device;
receiving the information from the second server.

8. The method according to claim 1, wherein the presentation time parameter comprises a start presentation time point and an end presentation time point, or a presentation time length.

9. A terminal device, comprising:
a memory; and
a processor configured to execute instructions stored in the memory to perform a plurality of operations, the plurality of operations comprising:
receiving an encoded media stream corresponding to an online streaming media playing service provided by a first server;
parsing the encoded media stream;
in response to parsing out an invalid value from a field or a flag of the encoded media stream, determining not to transmit an information obtaining request to a second server providing an information presentation service, the information obtaining request being a request of obtaining information from the second server to be presented on the terminal device; and
in response to no invalid value being parsed out from the field and the flag of the encoded media stream:
parsing out a presentation time parameter from the field of the encoded media stream;
determining a time range indicated by the presentation time parameter;
obtaining information to be presented in the time range from the second server providing an information presentation service;
presenting the obtained information in the time range.

10. The terminal device according to claim 9, wherein the presentation time parameter comprises a start presentation time point and an end presentation time point, or a presentation time length.

11. The terminal device according to claim 9, wherein the plurality of operations further comprise:
receiving a notification message sent from the first server;
obtaining the presentation time parameter from the notification message.

12. The terminal device according to claim 9, wherein the field is an indication field attached to the media stream, and the plurality of operations further comprise:
parsing the indication field attached to the media stream;
when parsing out that a value of the indication field is valid, obtaining the presentation time parameter according to the parsed value of the indication field; and
when paring out that the value of the indication field is invalid, determining not to acquire information from the second server.

13. The terminal device according to claim 9, wherein the field is an indication field attached to the media stream, and the plurality of operations further comprise:
parsing the flag attached to the media stream;
when parsing out that the flag is valid, parsing the indication field attached to the media stream, and obtaining the presentation time parameter according to the parsed value of the indication field; and
when parsing out that the flag is invalid, determining not to acquire information from the second server.

14. The terminal device according to claim 9, wherein the field is a reserved field in the media stream, and the plurality of operations further comprise:
parsing the reserved field in the media stream;
when parsing out that a value of the reserved field is valid, obtaining the presentation time parameter according to the parsed value of the reserved field; and
when paring out that the value of the reserved field is invalid, determining not to acquire information from the second server.

15. The terminal device according to claim 9, wherein the flag is a reserved flag in the media stream, and the field is a reserved field in the media stream, and the plurality of operations further comprise:
parsing the reserved flag in the media stream;
when parsing out that a value of the reserved flag is valid, parsing the reserved field in the media stream, and obtaining the presentation time parameter according to the parsed value of the reserved field; and
when parsing out that the value of the reserved flag is invalid, determining not to acquire information from the second server.

16. The terminal device according to claim 9, wherein obtaining the information to be presented in the determined time range from the second server providing the information presentation service comprises:
sending an information obtaining request to the second server, wherein the information obtaining request at least comprises a presentation number of the information and a length of the determined time range, wherein the information obtaining request is configured to trigger the second server to determine the information with the presentation number and the length of the time, and send the information to the terminal device; and
receiving the information from the second server.

17. A non-transitory computer storage medium storing computer instructions that, when being executed by a processor of a terminal device, causing the processor to perform a plurality of operations, the plurality of operations comprising:
receiving an encoded media stream corresponding to an online streaming media playing service provided by a first server;
parsing the encoded media stream;
in response to parsing out an invalid value from a field or a flag of the encoded media stream, determining not to transmit an information obtaining request to a second server providing an information presentation service, the information obtaining request being a request of obtaining information from the second server to be presented on the terminal device; and
in response to no invalid value being parsed out from the field and the flag of the encoded media stream:

parsing out a presentation time parameter from the field of the encoded media stream;
determining a time range indicated by the presentation time parameter;
obtaining information to be presented in the time range from the second server providing an information presentation service;
presenting the obtained information in the time range.

* * * * *